(12) United States Patent
Bachheibl

(10) Patent No.: US 10,110,081 B2
(45) Date of Patent: Oct. 23, 2018

(54) WINDING SYSTEM

(71) Applicant: FEAAM GmbH, Neubiberg (DE)

(72) Inventor: Florian Bachheibl, Munich (DE)

(73) Assignee: VOLABO GMBH, Holzkirchen (DE)

( * ) Notice: Subject to any disclaimer, the term of this patent is extended or adjusted under 35 U.S.C. 154(b) by 300 days.

(21) Appl. No.: 14/878,994

(22) Filed: Oct. 8, 2015

(65) Prior Publication Data
US 2016/0105063 A1    Apr. 14, 2016

(30) Foreign Application Priority Data

Oct. 8, 2014   (DE) .................. 10 2014 114 615

(51) Int. Cl.
*H02K 3/28* (2006.01)
*H02K 11/33* (2016.01)
*H02P 25/18* (2006.01)

(52) U.S. Cl.
CPC ............. *H02K 3/28* (2013.01); *H02K 11/33* (2016.01); *H02P 25/18* (2013.01); *H02K 2213/12* (2013.01)

(58) Field of Classification Search
CPC ...................................... H02K 3/28
USPC ......... 31/68 R, 71, 124, 125, 178, 180, 190, 31/201, 202, 211, 210, 212
See application file for complete search history.

(56) References Cited

U.S. PATENT DOCUMENTS

| | | | |
|---|---|---|---|
| 3,496,397 A * | 2/1970 | Andresen | H02K 17/185 310/212 |
| 5,912,522 A | 6/1999 | Rivera | |
| 6,097,127 A * | 8/2000 | Rivera | H02K 3/28 310/156.12 |
| 8,575,813 B2 * | 11/2013 | Kleber | H02K 15/0012 310/125 |
| 9,800,194 B2 * | 10/2017 | Dajaku | H02P 25/22 |
| 2003/0205986 A1 * | 11/2003 | Edelson | H02K 3/28 318/801 |
| 2005/0040716 A1 * | 2/2005 | Schmid | H02K 3/12 310/71 |
| 2006/0002054 A1 | 1/2006 | Anwar et al. | |
| 2015/0207389 A1 * | 7/2015 | Creviston | H02K 11/048 310/43 |
| 2015/0280503 A1 * | 10/2015 | Takahashi | H02K 3/12 310/201 |
| 2016/0126795 A1 * | 5/2016 | Chen | H02K 5/225 310/68 R |

OTHER PUBLICATIONS

Infineon: "OptiMOS 2 Small-Signal-Transistor", Infineon Technologies AG, 2008, Datasheet BSL214N, pp. 1-9 (<http://www.farnell.com/datasheets/1648250.pdf>).

(Continued)

*Primary Examiner* — Forrest M Phillips
(74) *Attorney, Agent, or Firm* — McDermott Will & Emery LLP

(57) ABSTRACT

A winding system for a stator and/or a rotor of an electric machine is disclosed. The winding system comprises several conductor sections, two annular conductors (+, −) on a first side of the winding system, to which the conductor sections are coupled by means of half bridges, and at least one half bridge on an opposite side of the winding system, to which at least one conductor section is connected.

22 Claims, 14 Drawing Sheets

(56) References Cited

OTHER PUBLICATIONS

Kwak, M.-S. et al.: "Flux Weakening Control of an Open Winding Machine with Isolated Dual Inverters", Industry Applications Conference 2007, 42nd IAS Annual Meeting, New Orleans, LA, Sep. 23-27, 2007, pp. 251-255.
Omega: "Radio Telemetry System for Strain Gages, Thermocouples and Voltage Signals", Omega Engineering Inc., 2003-2014, datasheet TX20B, pp. 1-3 (http://www.omega.com/pptst/TX20B.html).

* cited by examiner

WINDING SYSTEM

The present invention pertains to a winding system for a rotor and/or a stator of an electric machine.

In conventional electric machines, a multiphase, hardwired electric winding with only a few terminals, normally only one or two per phase, is connected to power electronics. In this case, the actual machine on the one hand and the power electronics on the other hand are usually accommodated in separate housings.

This not only results in large dimensions of the overall system, but also requires separate cooling of the power electronics and the actual machine with the stator and the rotor, as well as the electric winding, depending on the power density. In addition, problems with the electromagnetic compatibility may arise because the motor supply lines between the power electronics and the machine carry high currents with harmonic components such that additional shielding measures are required.

It is the objective of the present invention to disclose a winding system for a rotor and/or a stator of an electric machine which has a compact design.

This objective is attained with a winding system according to claim 1. Enhancements and embodiments are disclosed in the dependent claims.

In one embodiment, the winding system for a stator and/or a rotor of an electric machine comprises several conductor sections that are essentially arranged between opposite sides of the winding system. Two annular conductors, to which the conductor sections are coupled by means of half bridges, are provided on a first side of the winding system. At least one half bridge, to which at least one conductor section is connected, is provided on the opposite side of the winding system.

As described in greater detail below, the half bridges comprise switches, particularly semiconductor power switches, by means of which the respective end of the conductor section can be selectively connected to one of the two annular conductors. The proposed principle thereby allows the integration of the power electronics, particularly the half bridges, into an electric machine.

As a result, small structural sizes are achieved because an additional housing for the power electronics can be eliminated and the overall system becomes more compact.

A potentially required cooling system for the electric machine can simultaneously cool the power electronics, for example, with cooling air of the motor or the accommodation in a common water cooling jacket.

Practically no supply lines are required between the electric winding and the power electronics such that noise emissions and noise imissions associated therewith or alternative shielding measures for the motor supply lines are also eliminated.

The annular conductors and the conductor sections with the half bridges arranged in between replace the windings and inverters provided in conventional machines. In this case, the annular conductors replace the end windings of conventional machines.

Due to the plurality of half bridges with power-electronics switches provided therein, an individual power-electronics switch according to the proposed principle is confronted with such low currents and voltages that the power-electronics switch can be implemented with a particularly small chip surface.

The conductor sections may be homogenously distributed over the machine, for example along the circumference in a rotating machine, or follow different winding topologies.

In one embodiment, the machine is provided with slots in order to prevent short circuits. In this case, the conductor sections may be placed into a respective slot.

If the proposed winding system is used in a stator of an electric machine, it is during the operation of the machine possible to change the number of pairs of poles on the stator side, as well as the distribution of the harmonic component of the magnetomotive force in the air gap. Such a machine thereby can during its operation be clearly optimized further than existing machines in all load points.

If the described winding system is used in the stator and a PM-rotor, the stator can replicate the number of pairs of poles of the rotor, for example, when a high torque is required whereas the torque generation can be realized by means of a harmonic component of the magnetomotive force of the rotor at a low load.

If an asynchronous rotor is chosen, the described winding concept also makes it possible to utilize reluctance effects for the torque generation. For this purpose, a rotor-synchronous field component is modulated on the asynchronous machine in addition to the harmonic component, wherein said field component does not interact with the rotor currents due to the synchronicity, but can utilize the difference in inductance between rotor slots and rotor teeth for the torque generation.

In one embodiment, the winding system is realized with linear or straight conductor sections that are arranged parallel to one another. The conductor sections may be realized, for example, parallel to the axis or aligned at an angle thereto. The linear and parallel design of the conductor sections allows a particularly cost-efficient manufacture.

The two annular conductors on the first side of the winding system preferably form a two-pole DC-bus.

Two additional annular conductors are preferably provided on the opposite side of the winding system and may likewise form a two-pole DC-bus.

The at least one half bridge, which is located on the opposite side of the winding system, may be connected to these two annular conductors.

It would alternatively be possible, for example, that as many half bridges as conductor sections are provided on both sides of the conductor sections and connected to the respective pair of annular conductors arranged on the respective side of the winding system. In this case, a conductor section is respectively coupled to one pair of annular conductors on both ends by means of one respective half bridge.

In other embodiments, it is also possible, for example, to only connect a few of the conductor sections to two annular conductors by means of half bridges on the opposite side of the winding system and to short-circuit the remaining conductor sections, for example, with one another. A short-circuit ring may be provided for this purpose.

The conductor sections may comprise, for example, copper, aluminum, bronze, carbon nanotubes or graphene, as well as alloys of the cited materials.

In one embodiment, a control unit is provided and connected to the half bridges in order to realize the activation thereof. As described in greater detail below with reference to examples, the activation of the half bridges may be realized, for example, with concentrated logic or distributed logic. The activation of the half bridges may take place, for example, via an annular bus line.

In this case, drivers may be provided and connected between the control unit and the power switches comprised by the half bridges.

The control unit advantageously makes it possible to respectively change the number of pairs of poles of the stator or the rotor due to the activation of the half bridges.

Each conductor section of the winding system may in one embodiment be coupled to at least one half bridge on one end of the conductor section.

In one embodiment, the conductor sections are on their free ends coupled to an additional half bridge on the opposite side of the winding system.

The respective two-pole DC-bus formed by the two annular conductors may be respectively supplied with an intermediate circuit voltage. A capacitor may alternatively be connected to the DC-bus on one of the two sides of the winding system such that the wiring effort is additionally reduced. In this case, the DC-bus may be divided into several separate sections that are respectively supplied by capacitors or batteries. The part load characteristics of the machine can thereby be improved. A DC-voltage may be applied to one of the two DC-buses on the end faces of the machine in order to charge the machine.

When the batteries are charged by means of the applied DC-voltage, the inductance of the machine can be used as an up or down converter. In this way, the batteries can be optimally charged according to their characteristic, wherein only a constant voltage source is required as charging device.

The activation of the half bridges by means of the control unit may take place via a bus, for example a CAN-bus or I2C-bus. For example, only one address may be used for each conductor section in this case and different numbers of conductor sections can be connected depending on the power requirement.

This results in a flexible behavior of the machine during its operation, as well as a small address space and little protocol overhead for the activation of the half bridges.

In one embodiment, a stator is provided which comprises a winding system according to the proposed principle described above.

In one embodiment, a rotor is disclosed which comprises a winding system of the type described above.

If the proposed principle is used in a rotor, it would be possible, for example, to use a cage rotor. A cage rotor normally comprises a plurality of conductor sections that are arranged parallel to the axis and respectively connected to a short-circuit ring on both ends. If the short-circuit rings are removed and replaced with the proposed annular conductors with half bridges for producing the coupling with the conductor sections, a winding system for a rotor according to the proposed principle is realized.

In one embodiment, the control unit in the rotor is supplied with energy inductively, capacitively or by means of slip rings or commutator rings. For example, taps may be provided on the ends of the conductor sections and fed to a rectifier. In this way, the alternating field of the stator can initially activate the rotor and its electronics before the electronics in the rotor begin to connect the rotor bars on the DC-bus and thereby allow a current flow and a field generation. Only then is a torque generated.

During the operation of the proposed rotor, the stator generates in one embodiment an air gap harmonic component or a subharmonic component that interacts with the field-generated components of the rotor field as little as possible. The rotor therefore can still be supplied with energy without disadvantageously affecting the quality of the torque. The control electronics in the rotor may in this case be able to measure the air gap flux linkage and to adapt the rotor flux linkage thereto.

If the slip of the machine should also be adapted, an additional communication of the stator may take place with the activation of the rotor, for example, by means of radio transmission.

An electric machine may feature a stator according to the proposed principle.

The electric machine may alternatively or additionally feature a rotor according to the proposed principle.

Other details and embodiments of the proposed principle are described in greater detail below with reference to several exemplary embodiments illustrated in the drawings. In these drawings:

FIG. 1 shows an exemplary embodiment of a winding system according to the proposed principle, FIG. 2 shows a block diagram of an exemplary embodiment of a conductor section with two half bridges according to the proposed principle, FIG. 3 shows a perspective view of an exemplary embodiment of a stator with a winding system according to the proposed principle, FIG. 4 shows a different perspective view of the embodiment according to FIG. 3, FIG. 5 shows an exemplary embodiment of an electric machine with a stator according to the proposed principle, FIG. 6 shows a detail of the exemplary embodiment according to FIG. 5, FIG. 7 shows an enhancement of the detail according to FIG. 6 with carriers for the power electronics, FIG. 8 shows a block diagram of an exemplary embodiment of a winding system according to the proposed principle for a rotor, FIG. 9 shows a perspective view of an electric machine with a rotor according to the proposed principle, FIG. 10 shows a detail of the example according to FIG. 9, FIG. 11 shows a top view of another exemplary embodiment of an electric machine with a stator and a rotor according to the proposed principle, FIG. 12 shows a detail of the embodiment according to FIG. 11, FIG. 13 shows another exemplary embodiment of a machine according to the proposed principle in the form of a side view, FIG. 14 shows a detail of the illustration in FIG. 13, FIG. 15 shows an exemplary embodiment of the activation of a winding system for a stator according to the proposed principle with concentrated logic, FIG. 16 shows an exemplary embodiment of the central control unit for the activation according to FIG. 15, FIG. 17 shows an exemplary embodiment of the activation of a winding system for a stator according to the proposed principle with distributed logic, FIG. 18 shows an example of a control module for the activation of a half bridge according to the exemplary embodiment in FIG. 17, FIG. 19 shows an exemplary embodiment of a central control unit for the activation of the control modules according to FIGS. 17 and 18, FIG. 20 shows an exemplary embodiment of the activation of the half bridges in a winding system for a rotor according to the proposed principle with concentrated logic, FIG. 21 shows an exemplary embodiment of a central control unit for the activation according to FIG. 20, FIG. 22 shows an exemplary embodiment of the activation of the half bridges in a winding system for a rotor according to the proposed principle with distributed logic, FIG. 23 shows an example of a control module for the activation according to FIG. 22, FIG. 24 shows an exemplary embodiment of a central control unit for cooperating with the control modules according to FIGS. 22 and 23, FIG. 25 shows an exemplary embodiment of a winding system according to the proposed principle in the form of an enhancement of the exemplary embodiment according to FIG. 1, FIG. 26 shows an exemplary embodiment of a motor segment, FIG. 27 shows the exemplary embodiment according to FIG. 26 in the form of a side view, FIG. 28 shows the exemplary embodiment according to FIG. 26 in the form of a top view, FIG. 29 shows the exemplary embodiment according to FIG. 26 in the form of another enlarged side view, FIG. 30 shows an exemplary embodiment of the motor segment according to FIG. 26, however, with additionally installed power electronics, and FIG. 31 shows an enlarged detail of the exemplary embodiment of the motor segment according to FIG. 30.

FIG. 1 shows an exemplary embodiment of a winding system for a stator or a rotor of an electric machine according to the proposed principle. A DC-bus with one bar for the positive and one bar for the negative intermediate circuit voltage +, − is respectively located on the two end faces of the machine. The bars are realized in the form of annular conductors. The conductor sections in the iron core or air gap of the machine 3 are coupled to the two DC-buses +, − by means of half bridges 4, 5. An intermediate circuit supply of the two DC-buses is presently not illustrated. As an alternative to the intermediate circuit supply, one of the two buses may be connected to a capacitor as described in greater detail below.

The conductor sections 3 may comprise filaments of conductive material. The conductor sections 3 may comprise, for example, copper, aluminum or carbon nanotubes. The conductor sections may be arranged in the air gap of the machine, placed into respective slots of the stator or rotor or inserted into the respective iron core of the stator or rotor by means of boring or diecasting. A winding on teeth is therefore no longer required.

An entire machine of this design can alternatively be manufactured with comparatively little effort by means of laser sintering.

The conductor sections 3 may be homogenously distributed over the machine or follow special winding topologies.

The proposed principle makes it possible to carry out a reconfiguration of the winding during the ongoing operation of the machine and to change the number of pairs of poles, for example, of the stator if it is used on the stator side. The harmonic content of the air gap flux linkage of the machine can thereby also be changed.

In an enhancement, the conductor sections may be realized with carbon nanotubes as winding material. It is also advantageous that these tubes can fulfill tasks of power electronics such as, for example, the function of a power switch or a diode function by purposefully inserting impurities.

FIG. 2 shows a potential embodiment of a conductor section 3 and the half bridges 4, 5 connected to the respective ends of the conductor section. A first half bridge 4 comprises a switching module 6 that features two transistors 7, two diodes 8 and a capacitor 9. The two transistors 7 are connected to one another in series between a positive DC-bus bar + and a negative DC-bus bar −. A diode 8 is connected antiparallel to each transistor 7. One end of the conductor section 3 is connected to the common tapped node of the serial circuits consisting of the transistors and the diodes 7, 8. The module 6 therefore comprises two power switches that are respectively connected between the end of the conductor section 3 and the positive and negative DC-bus bars +, −. The control terminals of the transistors 7 of the module 6, in this case the gate terminals, are connected to a common driver 10. The driver 10 receives a switching signal from a control logic at an input 11 as described in greater detail below.

The half bridge 5 arranged on the opposite side of the winding system has the same design as the half bridge 4, which is not repeated at this point.

FIG. 3 shows a perspective view of an electric machine with a stator that features a winding system according to the proposed principle. The stator is identified by the reference symbol 1. A rotor 2 is arranged in the stator 1 and realized in the form of a conventional rotor with permanent magnets 12, wherein these permanent magnets respectively are alternately realized in the form of a north pole and a south pole along the circumference.

In this context, the choice of a PM-rotor only represents one of various options. The proposed winding system is also compatible with an asynchronous machine, a separately excited synchronous machine or a synchronous reluctance machine.

The two annular conductors +, −, which are realized in the form of concentric rings around the axis of the machine, are illustrated on the end faces of the stator 1. In this example, the inner annular conductor is the positive conductor of the DC-bus whereas the outer annular conductor is the negative conductor of the DC-bus. Several conductor filaments 30, which are arranged adjacent to one another in the radial direction, are respectively provided between the two annular conductors +, − and connected to one another in parallel such that they respectively form a conductor section 3. The end faces of the conductor filaments 30 are visible in FIG. 3.

The power electronics arranged over the end of the conductor filaments and between the annular conductors are not illustrated in FIG. 3 in order to provide a better overview.

The stator 1 essentially comprises an iron core. The region within the positive annular conductor + may either carry slots or the conductor filaments 30 are extended up to the air gap and the inner annular conductor is positioned at the air gap.

FIG. 3 shows the first side of the winding system, on which the half bridges 4 of the first side are not illustrated between the annular conductors, whereas FIG. 4 shows the opposite side of the winding system, on which the half bridges 5 are provided, but likewise not illustrated.

Figure 5:
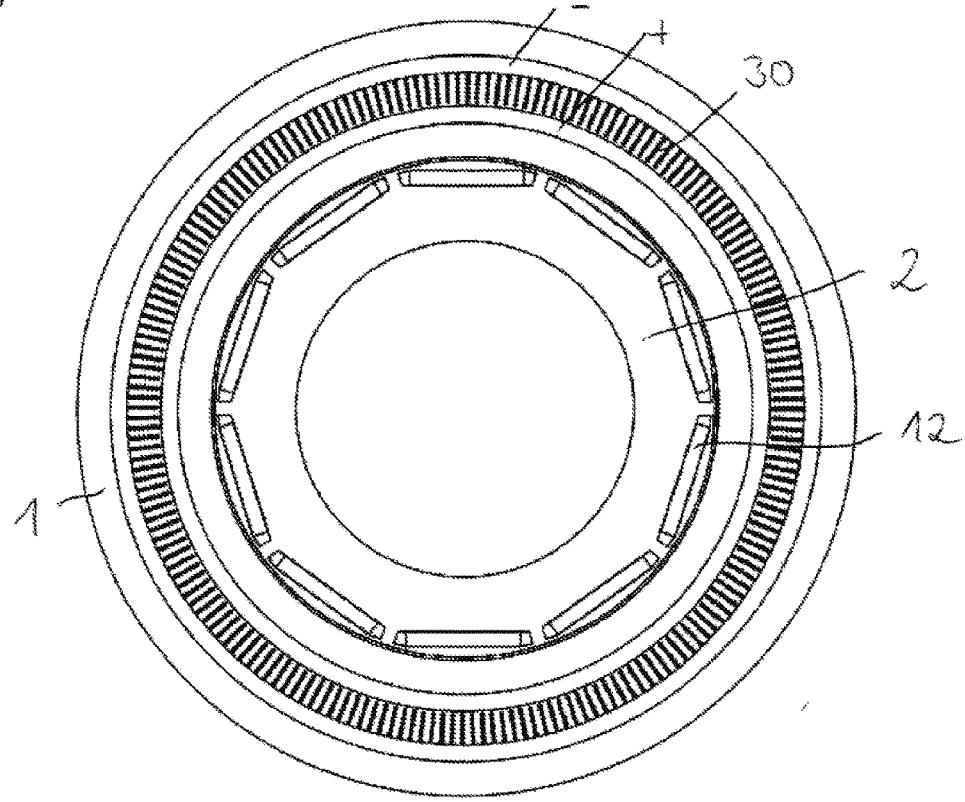
FIG. 5 shows the exemplary embodiment according to FIG. 3, however, in the form of a top view in the axial direction of the machine. This embodiment already was extensively described with reference to FIGS. 3 and 4 and is not repeated at this point.
Figure 6:
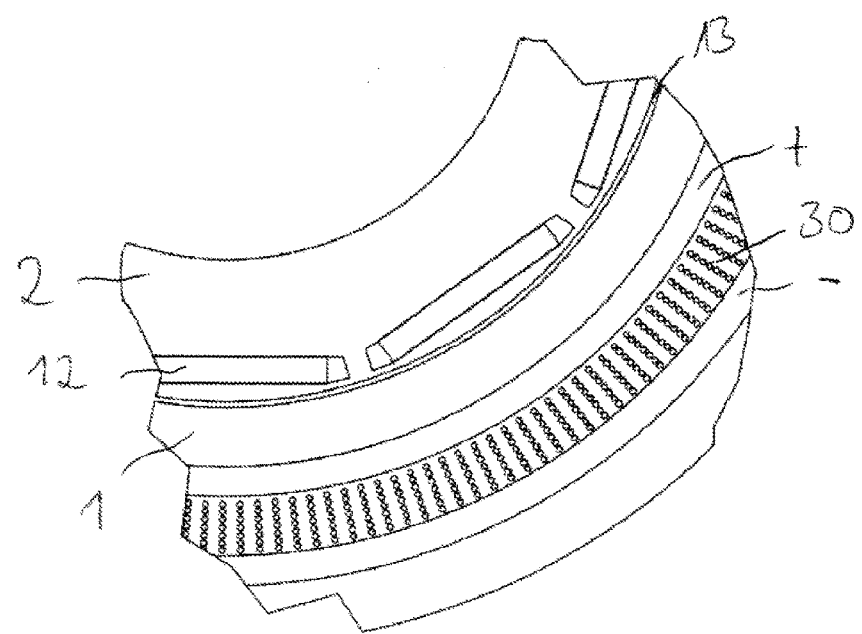

FIG. 6 shows the exemplary embodiment according to FIG. 5, however, in the form of an enlarged detail of the stator 1, the rotor 2 featuring permanent magnets 12 and an air gap 13 arranged in between. The stator 1 comprises an iron core, on the end faces of which the two annular conductors +, − of the DC-bus are mounted at a distance from one another and thereby isolated. The end faces of the conductor filaments extending in the axial direction are respectively illustrated between the two annular conductors, wherein said conductor filaments are in the present example respectively connected to one another in parallel in groups of seven and linearly arranged adjacent to one another in the radial direction. Seven of these radially adjacent conductor filaments 30 jointly form one respective conductor section 3 of the type illustrated in an exemplary fashion in the block diagram according to FIG. 1. The conductor sections 3 are distributed along the circumference of the stator 1.

The power electronics, which may comprise the half bridges and a control unit, are also not illustrated in FIG. 6.

Figure 7:
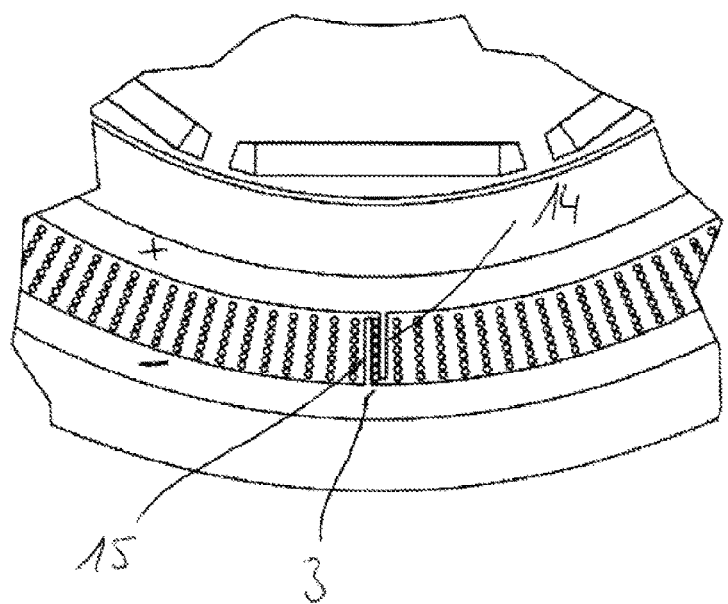

In this respect, FIG. 7 shows a less simplified illustration than FIG. 6, in which the corresponding webs 14, 15 or bars for a conductor section 3, which once again comprises seven conductor filaments 30, are also illustrated in an exemplary fashion. The webs 14, 15 extend in the radial direction from the positive annular conductor + and from the negative annular conductor − to the respective other annular conductor, are arranged parallel to one another and produce the mechanical and electrical connection between the annular conductors +, − and the half bridges 4, 5. In order to prevent a short circuit, an air gap remains between the webs 14, 15 and the respective other annular conductor.

The half bridges 4, 5 are not illustrated in FIG. 7. In order to provide a better overview, FIG. 7 furthermore only shows the webs 14, 15 for one conductor section 3 although these webs are actually provided for all conductor sections 3. For example, conventional semiconductor power switches, which are offered integrated into standard housings, can be used over the adjacent webs 14, 15 that extend parallel to one another from the opposing annular conductors in opposite radial directions and largely overlap. In this case, the ICs can be mounted in such a way, for example, that their principal direction extends in the circumferential direction and is extended from one conductor section 14 to the other conductor section 15.

Figure 8:
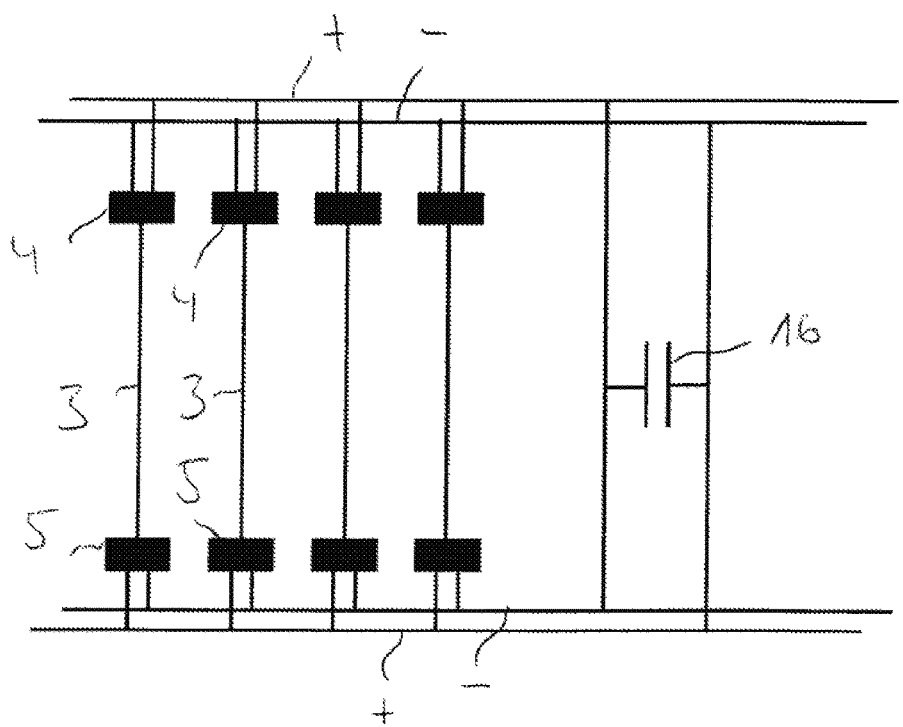

FIG. 8 shows a block diagram of an embodiment, in which the proposed principle of a winding system is used in a rotor. The block diagram largely corresponds to that illustrated in FIG. 1 and is insofar not described again at this point. A capacitor 16 is additionally connected between the two DC-buses +, − located on opposite sides of the rotor.

Figure 3:
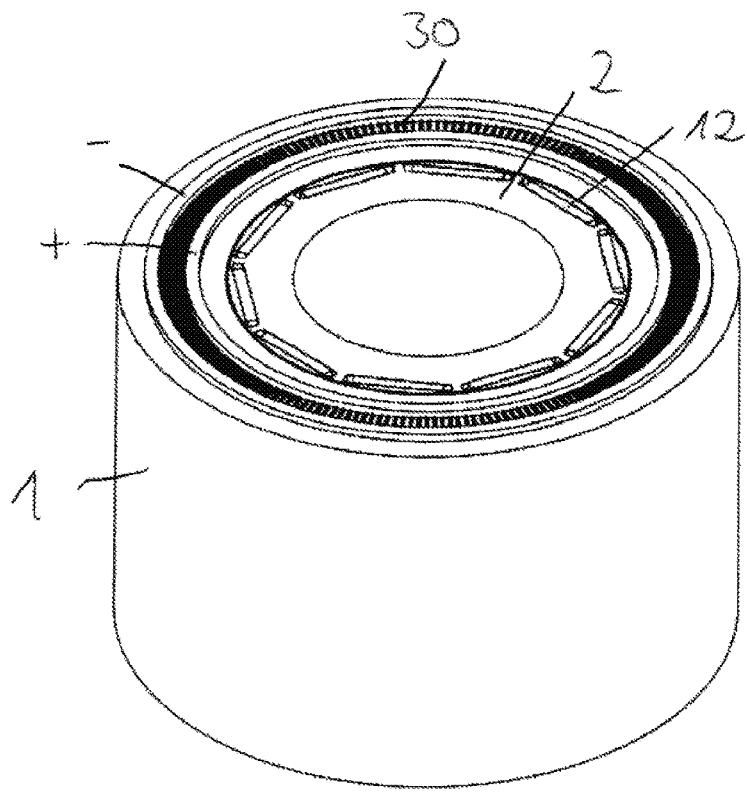
Figure 4:
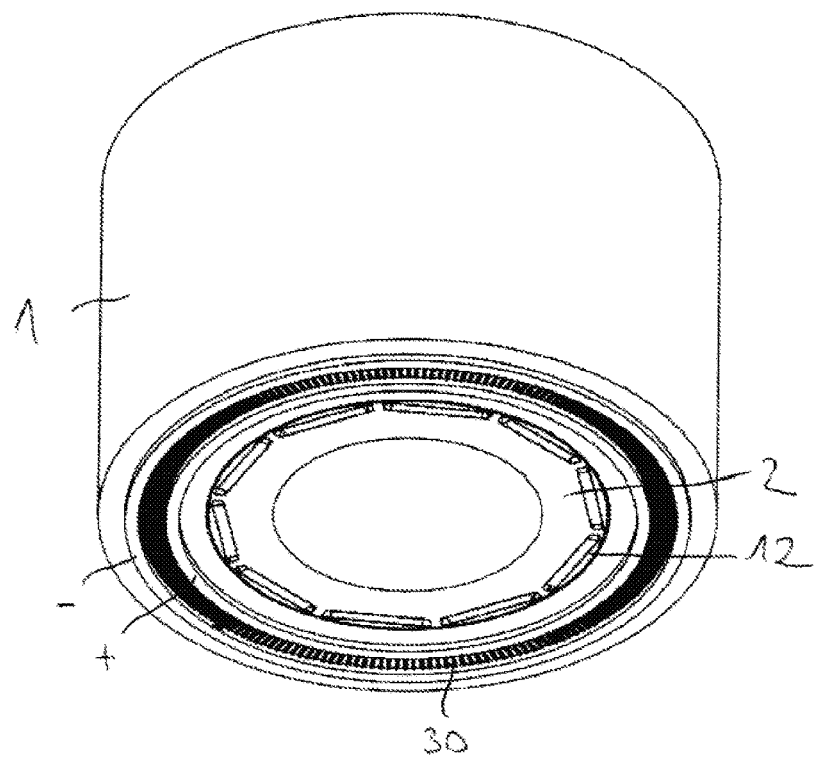
FIG. 4 shows another perspective view of the exemplary embodiment according to FIG. 3, however, viewed from the opposite side of the winding system. The description corresponds to that of FIG. 3 and therefore is not repeated at this point.
Figure 9:
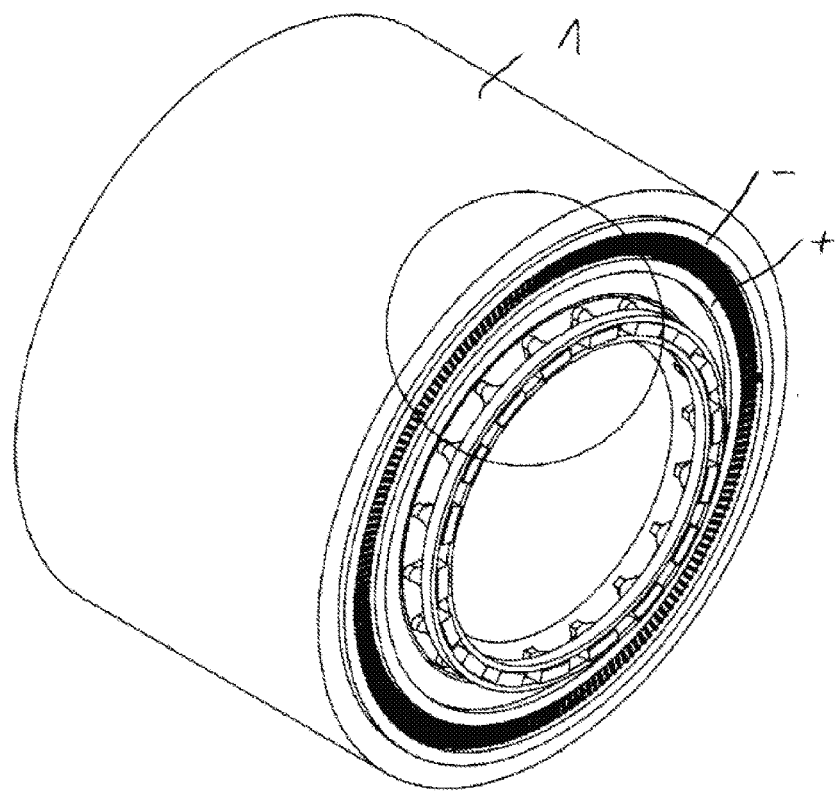

FIG. 9 shows an enhancement of the machine according to FIG. 3, in which the proposed winding system is not only used in the stator 1, but also in the rotor 2. The stator 1 corresponds to that of the embodiment according to FIGS. 3 and 4 and therefore is not described again at this point.

Figure 10:
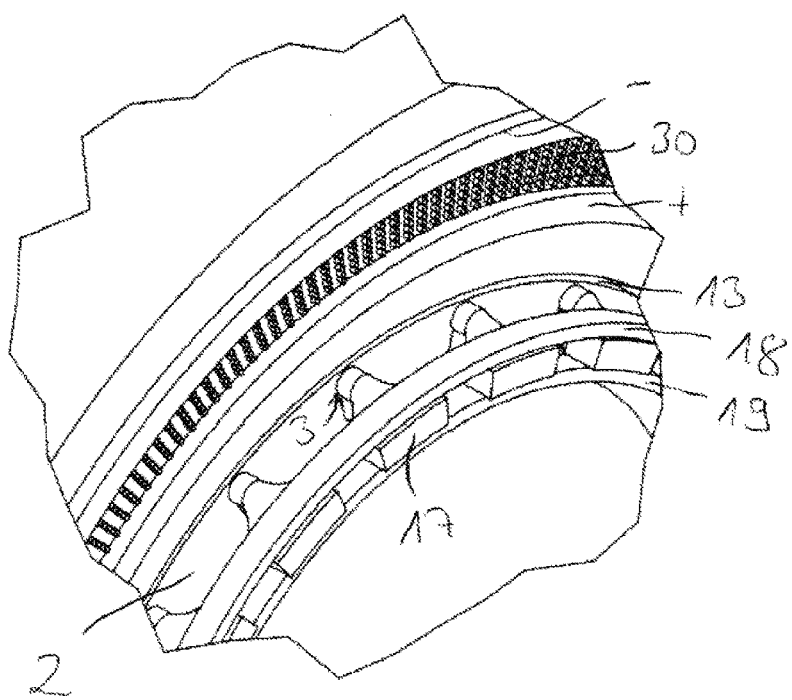

In contrast to said embodiment, the rotor 2 is in this case not realized in the form of a PM-rotor as illustrated in FIG. 10, but rather exemplarily implemented with a winding system according to the proposed principle that corresponds to the block diagram in FIG. 8. Accordingly, the rotor 2 also features half bridges 17, which couple the conductor section 3 to a positive and a negative annular conductor 18, 19, for each conductor section 3. The annular conductors are aligned concentric to the axis of the rotor and arranged in a common plane perpendicular to the rotational axis. The two annular conductors 18, 19 of the rotor are in this case attached to the end faces of the rotor at a distance from one another and mechanically and electrically contacted by means of the half bridges 17.

Figure 11:
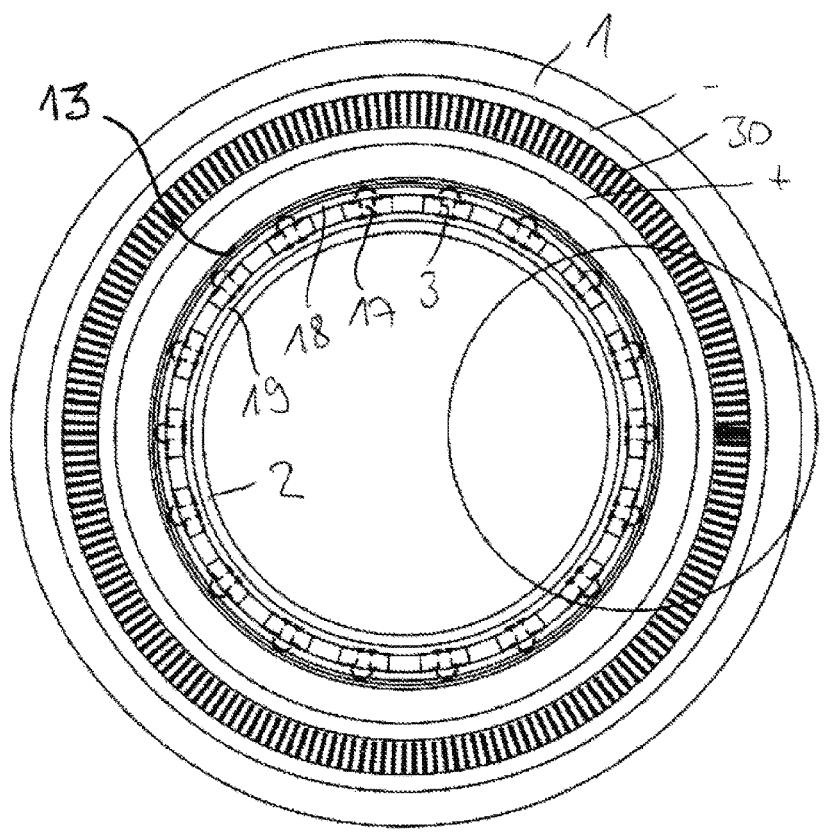

FIG. 11 shows the embodiment according to FIGS. 9 and 10 in the form of a top view of the end face of the machine, i.e. viewed in the axial direction.

This figure once again shows the rotor with the two annular conductors 18, 19, the half bridges 17 that are arranged in between and respectively contact one conductor section 3 in the axial direction, as well as the air gap 13 between the rotor and the stator.

Figure 12:
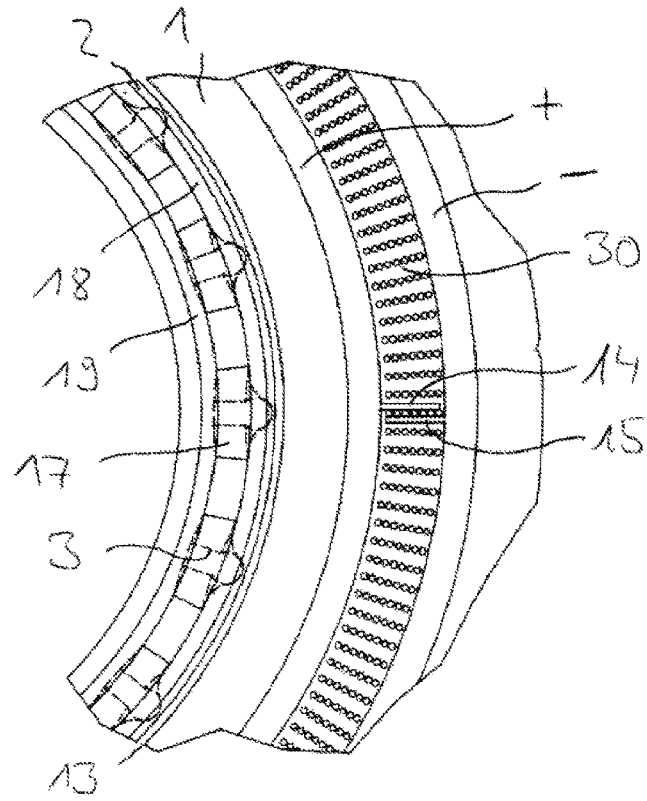

The geometries and details of the arrangement according to FIG. 11 are illustrated more clearly in the enlarged detail according to FIG. 12.

Figure 13:
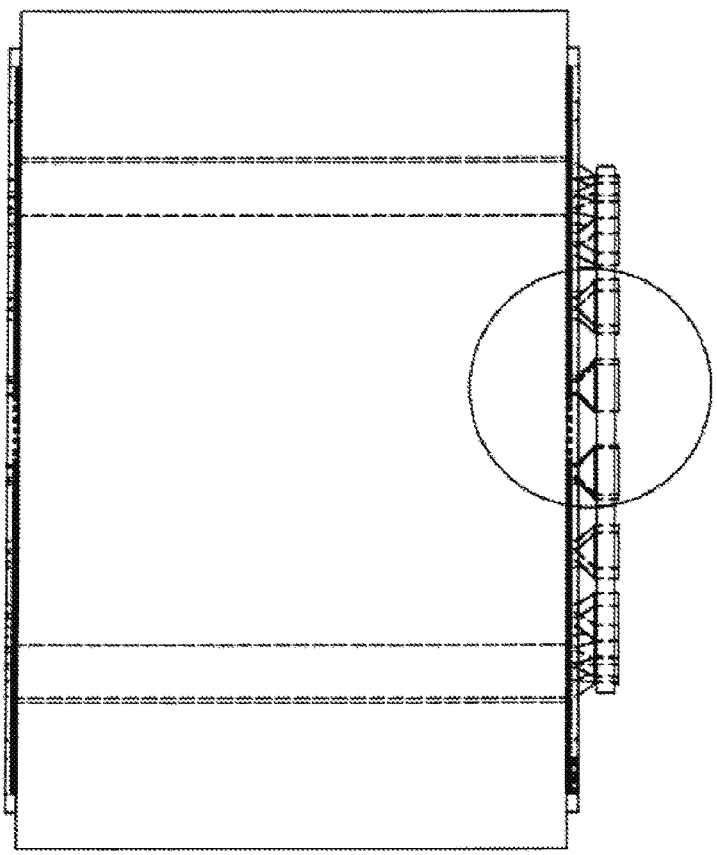

FIG. 13 shows the exemplary embodiment according to FIGS. 9-12 in the form of a side view.

Figure 14:
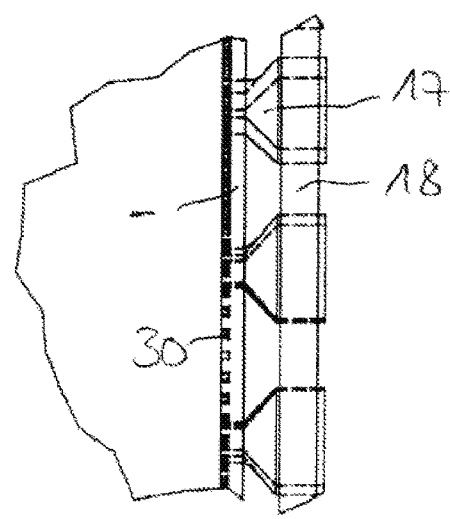

In this context, FIG. 14 shows an enlarged detail of the exemplary side view according to FIG. 13. FIG. 14 clearly shows how the half bridges 17 of the rotor contact the two annular conductors 17, 18, of which only the outer conductor 18 is visible in this figure.

Figure 15:
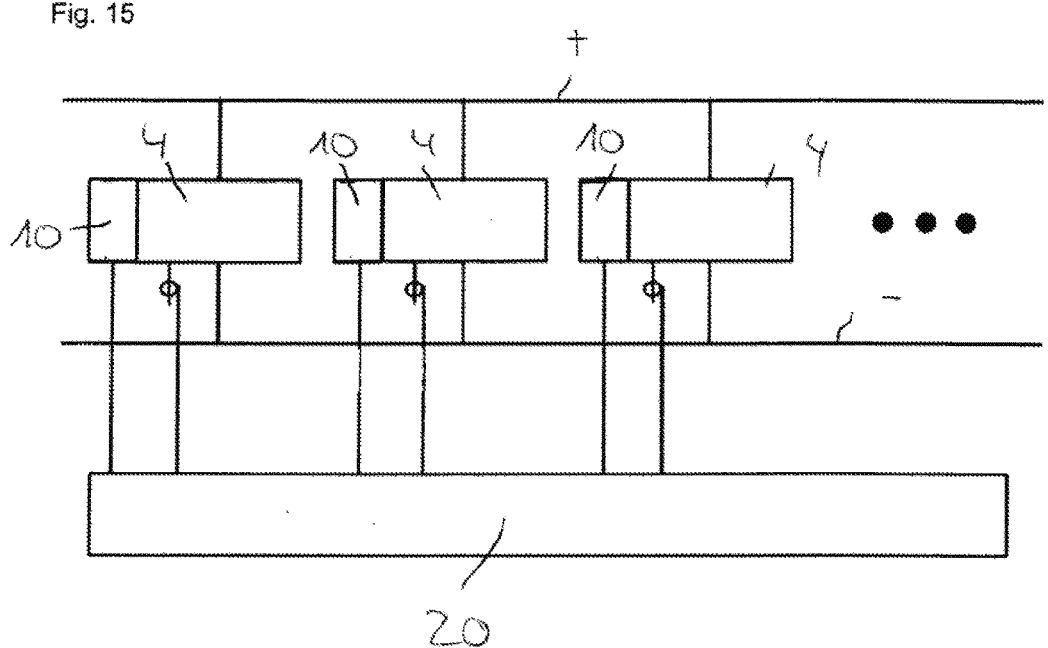

FIG. 15 shows an exemplary embodiment of a control unit for the activation of the half bridges 4, 5 of the stator. The control unit with concentrated logic according to FIG. 15 comprises a central control unit 20 that is connected to driver circuits 10. Each driver 10 is assigned to one half bridge 4. The half bridges 4 are coupled back to the central control unit 20 via current sensors. The half bridges 4 are connected between a positive DC-bus bar + and a negative DC-bus bar −.

The structure of the central control unit 20 is described in greater detail below with reference to the example illustrated in FIG. 16. The control unit 20 comprises a current regulator 21 that receives external nominal value settings 23 via superimposed control circuits 22. In addition, the current regulator 21 is coupled to an actual current value sensor 24, which receives signals from the conductor sections 3 that are respectively connected to the half bridges 4. The current regulator 21 is vectorially connected to a block for the pulse-width modulation signal generation 25. The pulse-width modulation signal generator 25 is coupled to each half bridge 4 via the drivers 10.

This makes it possible, for example, to change the number of pairs of poles during the operation of the machine.

Figure 16:
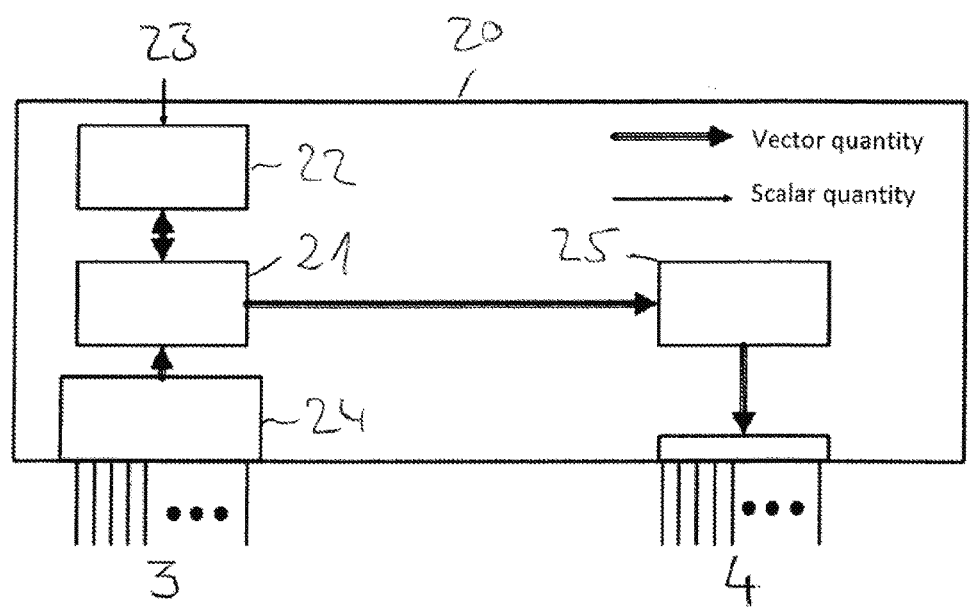
Figure 17:
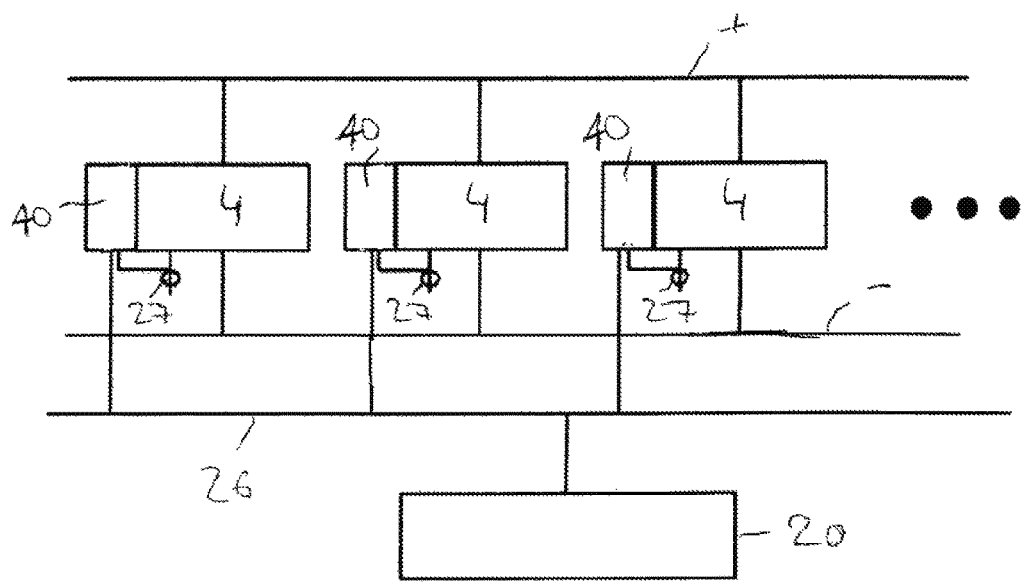
Figure 18:
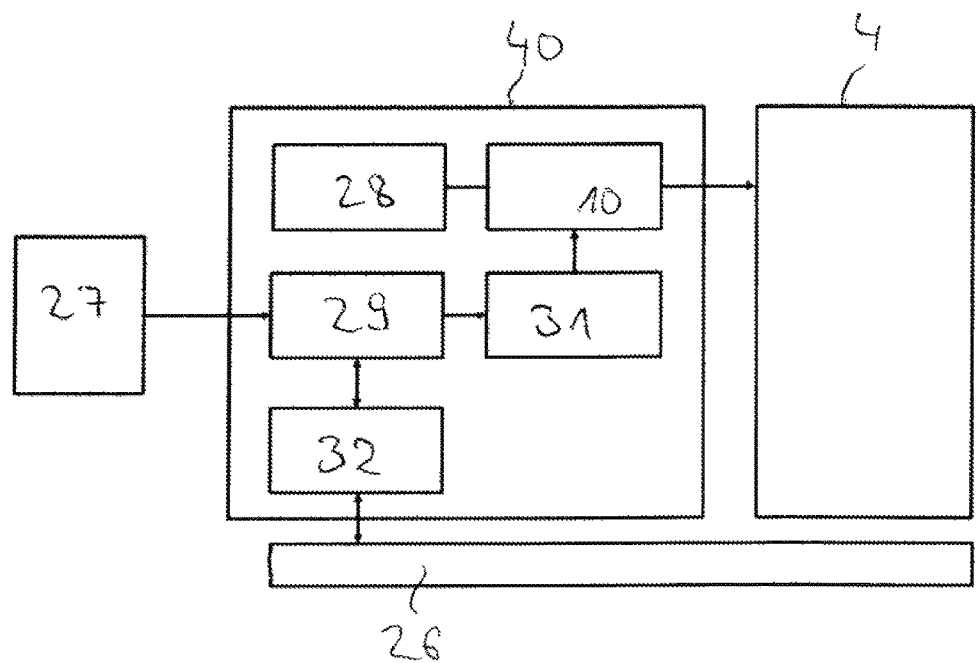
Figure 19:
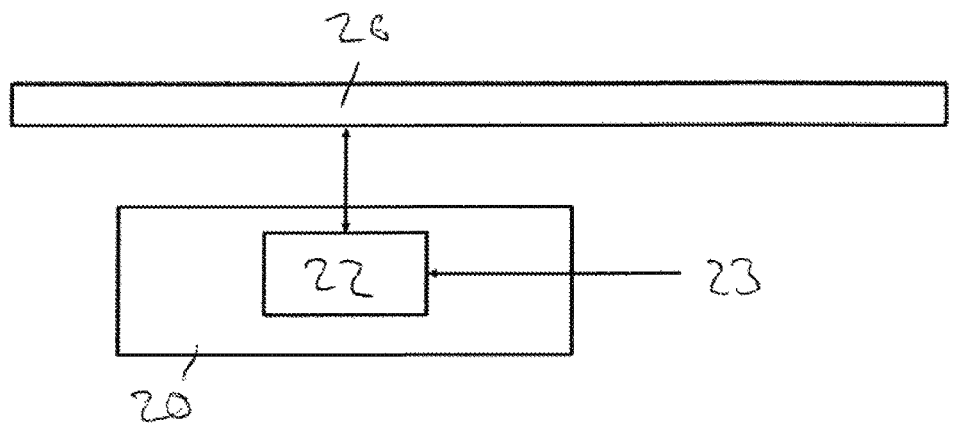

FIGS. 17-19 show an alternative embodiment of the control logic for a stator of a machine according to the proposed principle. This embodiment is based on a distributed logic rather than the concentrated logic illustrated in FIGS. 15 and 16. A control module 40 is respectively assigned to the half bridges 4 in FIG. 17. In contrast to the drivers 10 of the concentrated logic, however, these control modules 40 are not directly connected to the central control unit 20, but rather via a data bus 26. An actual current value sensor 27 respectively acquires the currents in the half bridges 4 locally and feeds these currents directly back into the control modules 40, which thereby can carry out a distributed activation of the half bridges.

FIG. 18 shows an exemplary embodiment of the control modules 40 according to FIG. 17 which respectively control a half bridge 4 assigned thereto. The control module 40 comprises a driver with a DC-supply 28. An external actual current value sensor 27 feeds currents to a current regulator 29. The current regulator 29 controls a PWM-generator 31 that in turn is connected to the respective driver 10 in order to realize the activation thereof. The current regulators furthermore communicate with the data bus 26 by means of bus controllers 32 and exchange actual and nominal values.

According to the example illustrated in FIG. 19, the data bus 26 is connected to the central control unit 20. This control unit 20 comprises superimposed control circuits 22 that receive external nominal value settings 23 and are bidirectionally coupled to the data bus 26.

Figure 20:
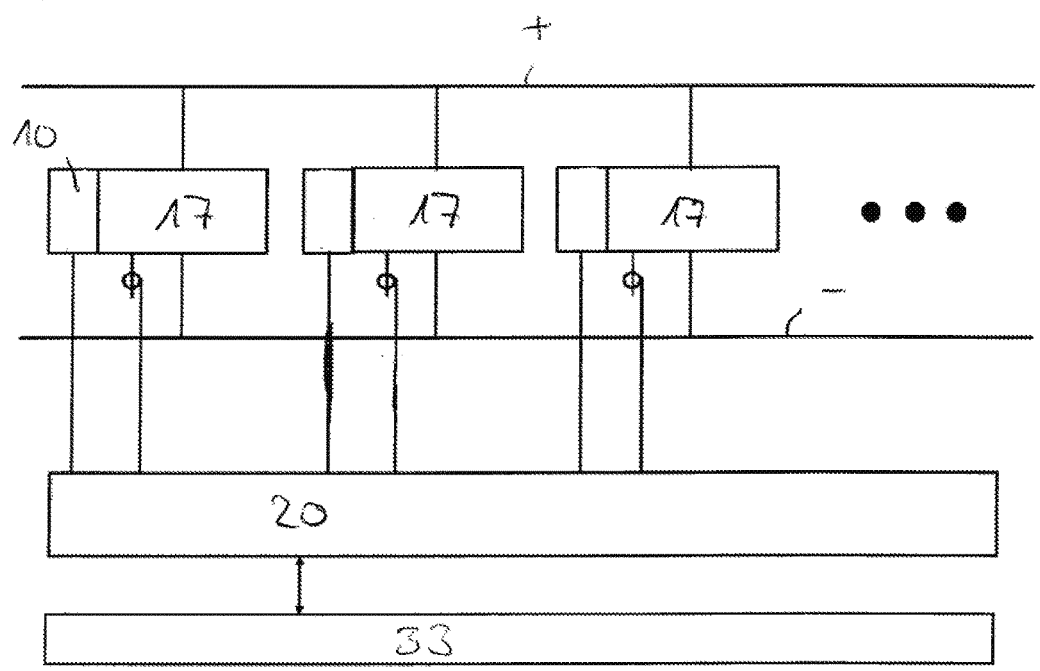

FIG. 20 shows an embodiment of an activation of a winding system for a rotor according to the proposed principle with concentrated logic. This example largely corresponds to the concentrated logic for the activation of a stator according to FIG. 15 and is insofar not described again. The half bridges of the rotor are in this case identified by the reference symbol 17 rather than the reference symbol 4. In contrast to the activation of the stator, however, the central control unit 20 is coupled to a radio link 33. The radio link 33 serves for the communication with the central control unit 20.

Figure 21:
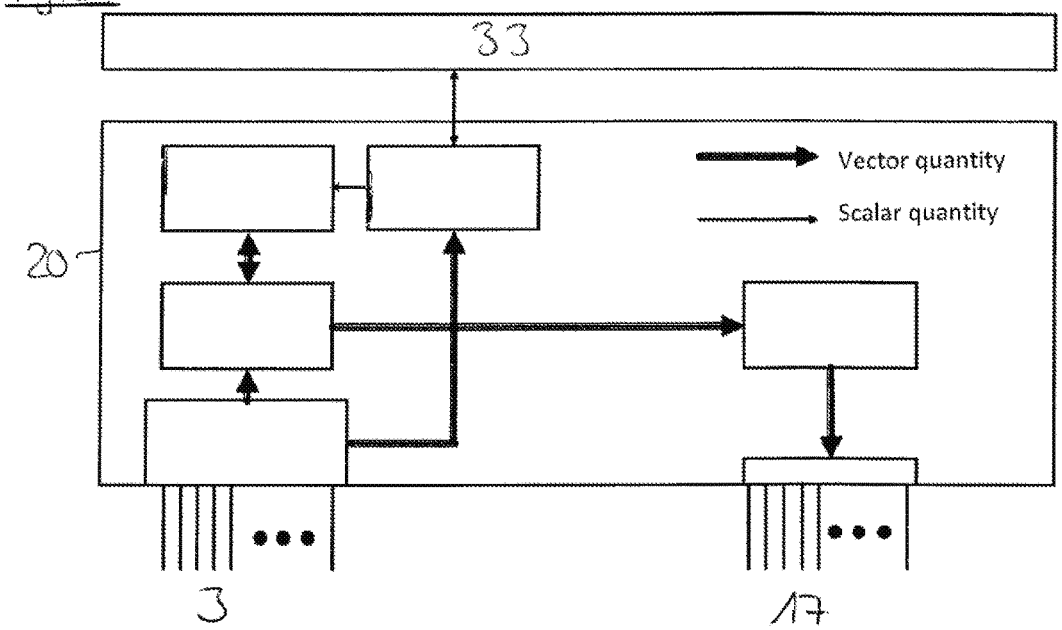

The central control unit 20 according to FIG. 21, which is designed for the exemplary activation of the rotor according to the proposed principle with concentrated logic, corresponds to that of the stator according to FIG. 16 and is merely supplemented with the radio link 33 according to FIG. 20.

We therefore refrain from a repetition of the description at this point.

Figure 22:
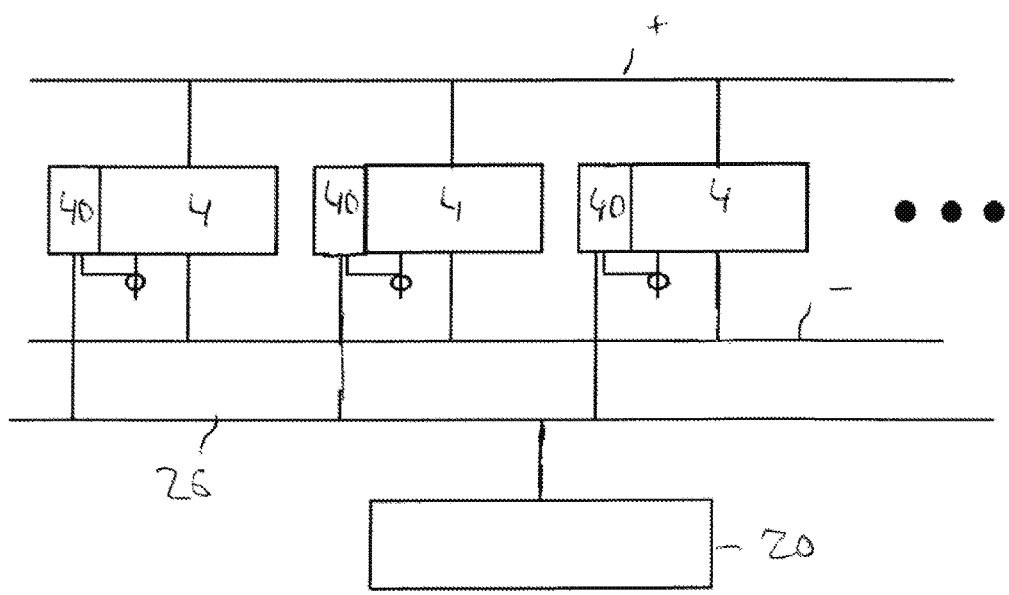
Figure 23:
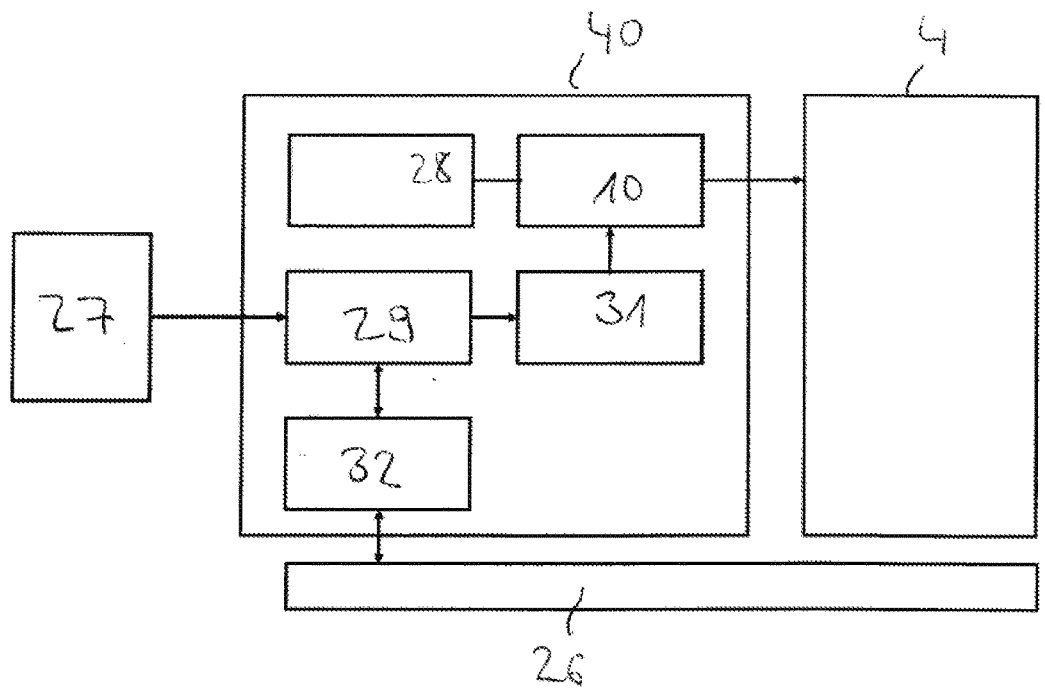
Figure 24:
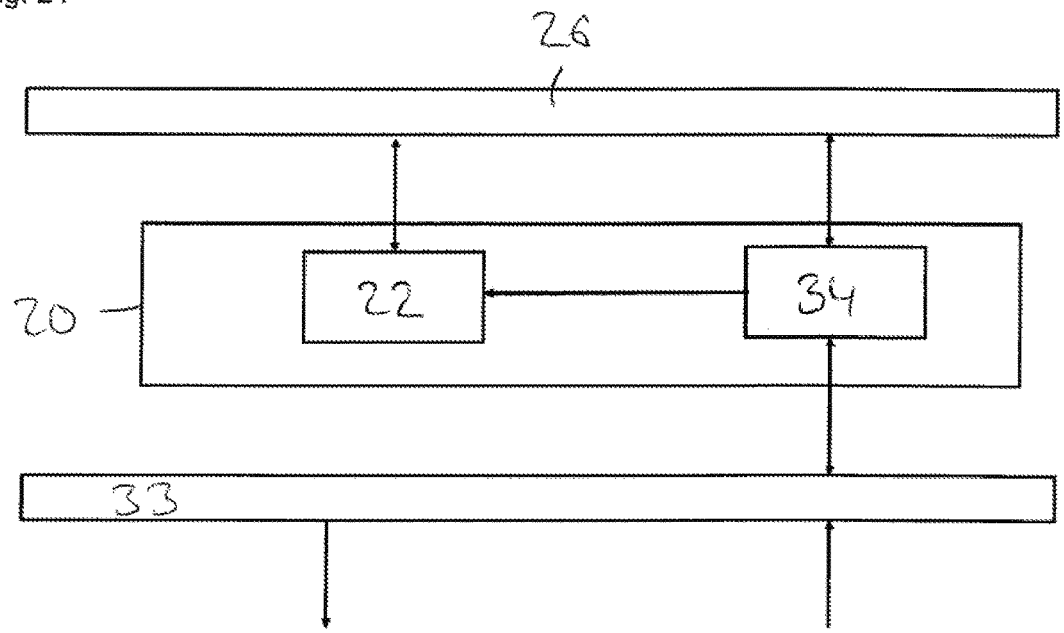

FIGS. 22-24 show an exemplary activation of a winding system for a rotor according to the proposed principle with distributed logic. The activation largely corresponds to that of a stator with distributed logic, which already was extensively described above with reference to FIGS. 17-19. We therefore refrain from a repetition at this point. The differences between the activation of the rotor and the activation of the stator with distributed logic are elucidated in FIG. 24. In contrast to FIG. 19, the central control unit 20 in this case not only comprises the superimposed control circuits 22, but also a telemetry module 34 that activates the superimposed control circuits and is itself bidirectionally coupled to the data bus 26. The telemetry module 34 is furthermore coupled to the radio link 33. Nominal value settings are received and rotor variables are fed back via the radio link 33.

Figure 1:
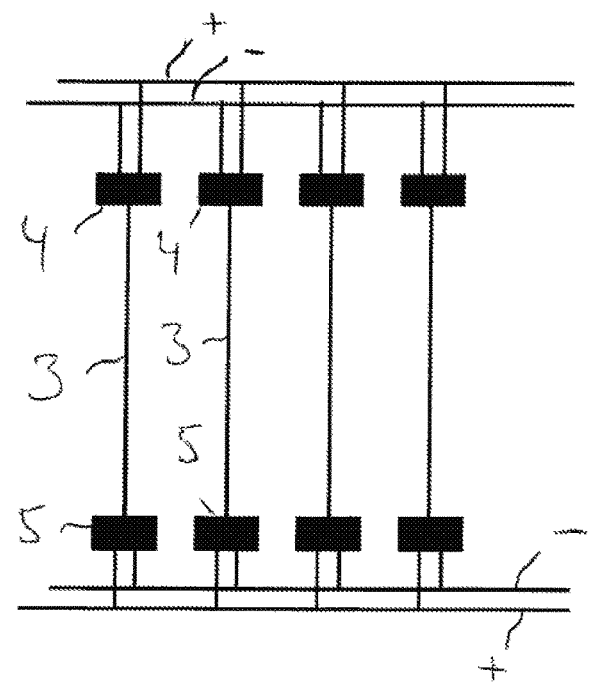
Figure 2:
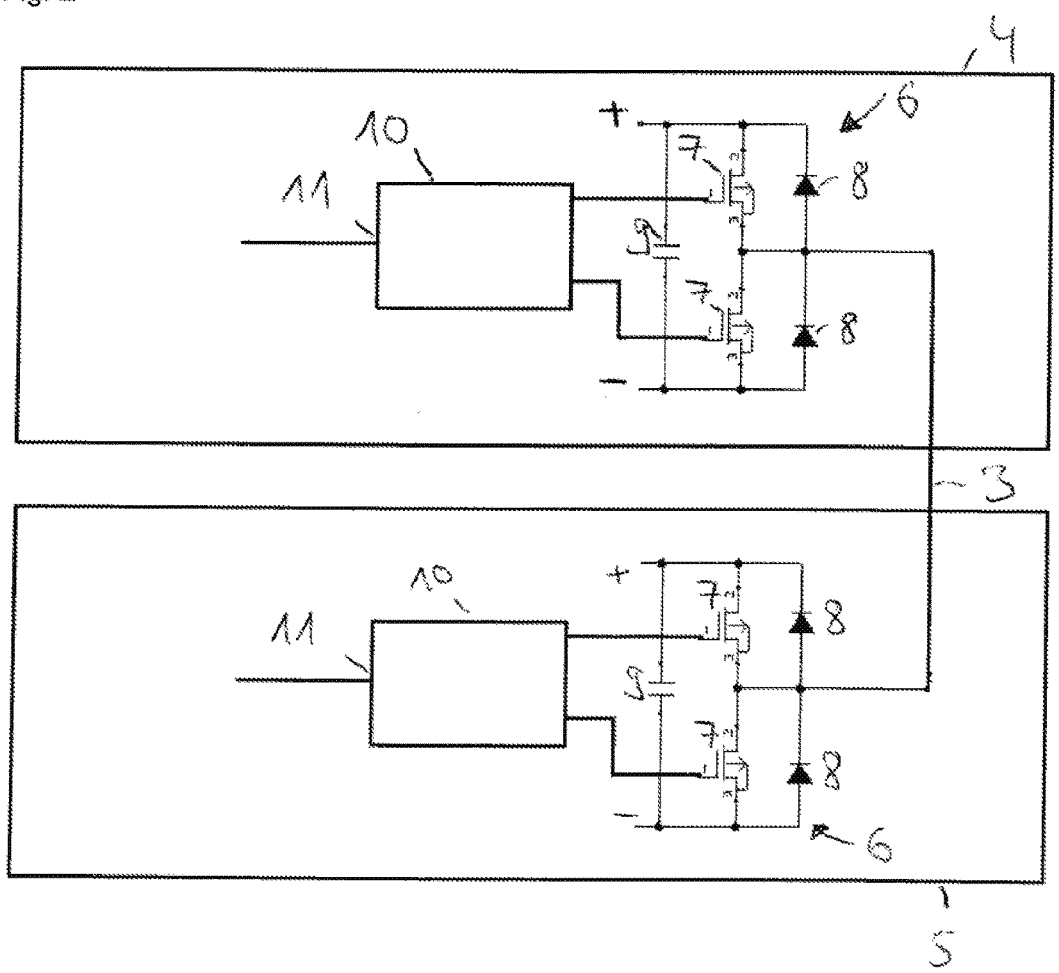
Figure 25:
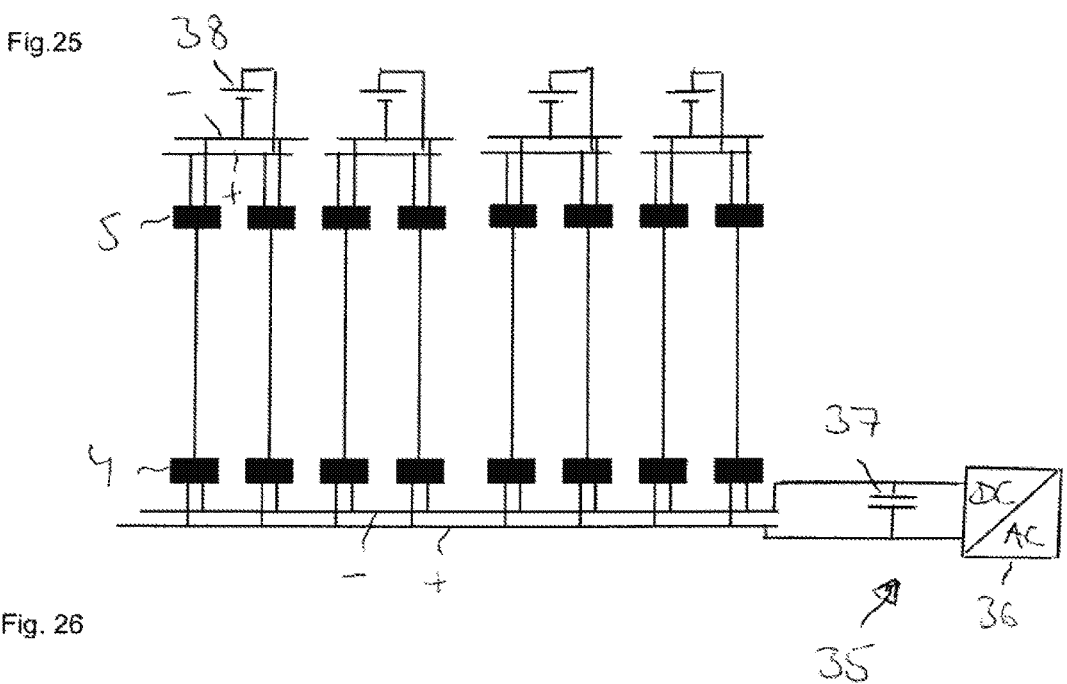

FIG. 25 shows an exemplary enhancement of the block diagram according to FIG. 1.

In FIG. 1, both DC-buses, i.e. the DC-bus coupled to the half bridges 4 as well as the DC-bus coupled to the half bridges 5 on the opposite side of the winding system, are supplied with an intermediate circuit voltage. In the embodiment according to FIG. 25, in contrast, one of the two DC-buses is connected to an intermediate circuit supply 35, namely the DC-bus drawn on the lower edge of this figure. The intermediate circuit supply 35 comprises an AC/DC converter 36, as well as a back-up capacitor 37. The half bridges 5 on the opposite side of the winding system are not supplied with an intermediate circuit voltage, but respectively coupled to a capacitor or a battery 38. A further enhancement in FIG. 25 can be seen in that this DC-bus is in accordance with another option divided into several DC-buses. In the present example, two half bridges 5 are respectively connected to a common DC-bus that therefore can be referred to as a partial bus. Each of these partial buses is coupled to its own battery 38. This reduces the wiring effort and makes it possible to realize a decentralized energy buffer with high power conversion. It is furthermore advantageous that the division of the DC-bus into partial buses, as well as their supply by different batteries, allows an improvement of the part load characteristics of the system. The DC-supply 35 simultaneously serves for charging the batteries 38, wherein the inductance of the machine is respectively utilized as up or down converter. In this case, only a stabilized power source is required as charging device.

Figure 26:
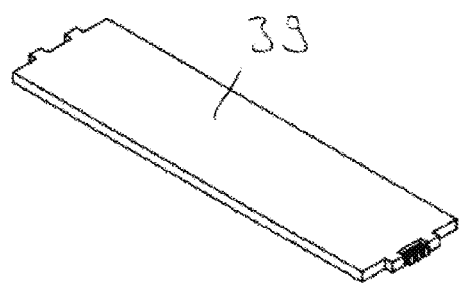

FIG. 26 shows an exemplary embodiment of a motor segment 39 in the form of a perspective view.

Figure 27:
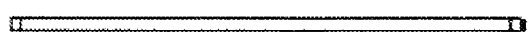
Figure 28:
Figure 29:
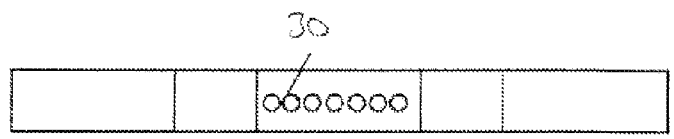

FIGS. 27-29 respectively show the motor segment in the form of different side views and a top view. According to the side view illustrated in FIG. 29, the motor segment features the filaments 30, which jointly form the conductor section 3, adjacent to one another in a central region. These conductor filaments 30 extend in the motor segment along the principal direction thereof.

Figure 30:
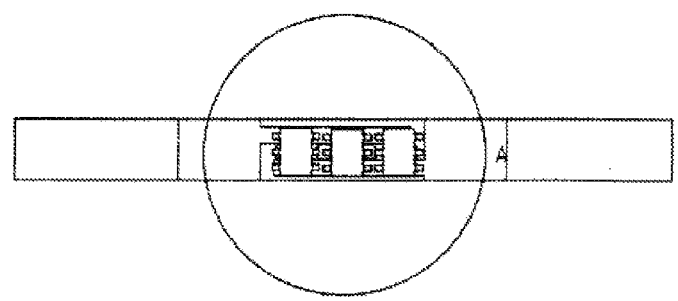
Figure 31:
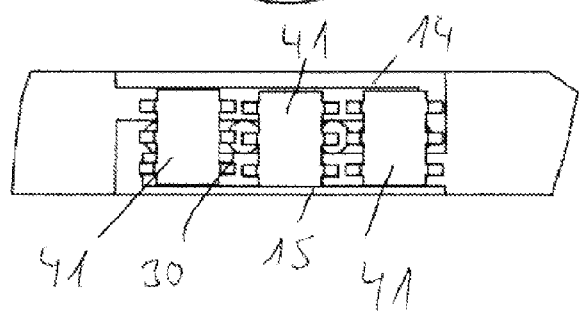

FIGS. 30 and 31 show in an exemplary fashion how the motor segment is arranged between the webs 14, 15 of the two annular conductors of the DC-bus. Integrated circuits 41, which are arranged between the webs 14, 15 in a mechanically and electrically connected fashion and simultaneously contact the filaments 30, are therefore arranged over the end face of the filaments 30 that respectively form a conductor section 3. The integrated circuits 41 comprise the semiconductor switches 7, the diodes 8 and the capacitor 9 and therefore realize the half bridges 4 of the proposed principle. It can therefore be clearly gathered that the power electronics are integrated into the machine according to the proposed principle and not accommodated in a separate housing. This results in the cited advantages such as a compact design, a cost-efficient manufacture, as well as a low noise emission and noise imission due to the reduced wiring effort between the power electronics and the machine.

The invention claimed is:

1. A winding system for a stator or a rotor of an electric machine, comprising:
several conductor sections;
two annular conductors on a first side of the winding system, to which the conductor sections are coupled by means of half bridges;
at least one half bridge on an opposite side of the winding system, to which at least one conductor section is connected; and
a control unit that is connected to the at least one half bridge in order to realize the activation thereof,
wherein the control unit is configured in such a way that the number of pairs of poles of the stator or the rotor can be changed due to the activation of the at least one half bridge.

2. The winding system according to claim 1, wherein the conductor sections are realized straight and are arranged in parallel to one another.

3. The winding system according to claim 1 or 2, wherein the two annular conductors form a two-pole DC-bus.

4. The winding system according to claim 1 or 2, wherein two additional annular conductors are provided on the opposite side of the winding system, wherein at least one half bridge located on the opposite side of the winding system is connected to these two additional annular conductors.

5. The winding system according to claim 1 or 2, wherein the conductor sections are distributed along a circumference of the stator or rotor.

6. The winding system according to claim 1 or 2, wherein the conductor sections comprise copper, aluminum, carbon nanotubes or graphene.

7. The winding system according to claim 1 or 2, wherein the conductor sections respectively comprise several conductor filaments that are arranged in parallel to one another and are electrically connected in parallel.

8. A stator with a winding system according to claim 1 or 2.

9. A rotor with a winding system according to claim 1 or 2.

10. An electric machine
with a stator with a winding system according to claim 1 or 2; or
with a rotor with the winding system.

11. The winding system according to claim 1, wherein a DC-bus of the opposite side of the winding system is connectable to a stabilized voltage supply and is configured to be used as a step-down converter for charging.

12. The winding system according to claim 2, wherein a DC-bus of the opposite side of the winding system is connectable to a stabilized voltage supply and is configured to be used as a step-down converter for charging.

13. The winding system according to claim 3, wherein a DC-bus of the opposite side of the winding system is connectable to a stabilized voltage supply and is configured to be used as a step-down converter for charging.

14. The winding system according to claim 4, wherein a DC-bus of the opposite side of the winding system is connectable to a stabilized voltage supply and is configured to be used as a step-down converter for charging.

15. The winding system according to claim 1, wherein a DC-bus of the first side is split into several sections, and wherein each section is connected to an individual battery module.

16. The winding system according to claim 2, wherein a DC-bus of the first side is split into several sections, and wherein each section is connected to an individual battery module.

17. The winding system according to claim 3, wherein a DC-bus of the first side is split into several sections, and wherein each section is connected to an individual battery module.

18. The winding system according to claim 4, wherein a DC-bus of the first side is split into several sections, and wherein each section is connected to an individual battery module.

19. The winding system according to claim 11, wherein a DC-bus of the first side is split into several sections, and wherein each section is connected to an individual battery module.

20. The winding system according to claim 12, wherein a DC-bus of the first side is split into several sections, and wherein each section is connected to an individual battery module.

21. The winding system according to claim 13, wherein a DC-bus of the first side is split into several sections, and wherein each section is connected to an individual battery module.

22. The winding system according to claim 14, wherein a DC-bus of the first side is split into several sections, and wherein each section is connected to an individual battery module.

* * * * *